(12) United States Patent
Chao et al.

(10) Patent No.: US 7,480,744 B2
(45) Date of Patent: Jan. 20, 2009

(54) METHOD AND APPARATUS FOR ONE TIME PROGRAMMING

(75) Inventors: Ming-Yang Chao, Hsin-Chu Hsien (TW); You-Wen Chang, Hsinchu (TW); Chien-Hsun Tung, Taichung (TW)

(73) Assignee: Mediatek, Inc., Hsin-Chu (TW)

( * ) Notice: Subject to any disclaimer, the term of this patent is extended or adjusted under 35 U.S.C. 154(b) by 281 days.

(21) Appl. No.: 11/563,236

(22) Filed: Nov. 27, 2006

(65) Prior Publication Data

US 2007/0180165 A1     Aug. 2, 2007

Related U.S. Application Data

(60) Provisional application No. 60/743,126, filed on Jan. 12, 2006.

(51) Int. Cl.
*G06F 3/00* (2006.01)
*G06F 13/12* (2006.01)

(52) U.S. Cl. .................. 710/8; 710/72; 710/104; 710/305; 365/225.5

(58) Field of Classification Search .............. 710/5, 710/8, 72–74, 104, 305; 705/55; 365/225.5
See application file for complete search history.

(56) References Cited

U.S. PATENT DOCUMENTS

| | | | |
|---|---|---|---|
| 4,879,688 A | | 11/1989 | Turner et al. |
| 5,650,734 A | | 7/1997 | Chu et al. |
| 5,680,061 A | | 10/1997 | Veenstra et al. |
| 5,734,868 A | | 3/1998 | Curd et al. |
| 5,812,662 A | * | 9/1998 | Hsu et al. .............. 705/55 |
| 5,869,980 A | | 2/1999 | Chu et al. |
| 5,949,987 A | | 9/1999 | Curd et al. |
| 6,170,043 B1 | | 1/2001 | Hu |
| 6,373,771 B1 | | 4/2002 | Fifield et al. |
| 6,507,881 B1 | | 1/2003 | Chen |
| 6,691,143 B2 | | 2/2004 | Blaker |
| 6,732,246 B2 | | 5/2004 | Okaue |
| 6,820,105 B2 | | 11/2004 | Blaker |
| 6,963,644 B1 | | 11/2005 | Matsuzaki et al. |
| 7,046,570 B1 | * | 5/2006 | Hubbard ............ 365/225.7 |

(Continued)

FOREIGN PATENT DOCUMENTS

CN           1166650        12/1997

(Continued)

OTHER PUBLICATIONS

CN Office Action, mailed May 30, 2008.

(Continued)

*Primary Examiner*—Christopher B. Shin
(74) *Attorney, Agent, or Firm*—Thomas, Kayden, Horstemeyer & Risley (57) ABSTRACT

A programmable system for storage of one-time programmable information comprises an interface translator and a one-time programmable device. The interface translator receives and translates a command code to program code comprising a sequence of write instructions and a designated data block. The one-time programmable device is coupled to the interface translator, programmed by the write instructions to store the designated data block. The one-time programmable device can only be programmed once, such that the designated data block being stored is fully protected.

18 Claims, 8 Drawing Sheets

U.S. PATENT DOCUMENTS

2005/0105331 A1    5/2005    Lee et al.
2006/0202232 A1*    9/2006    Takami ....................... 257/209
2007/0153609 A1*    7/2007    Wu et al. ................. 365/225.7

FOREIGN PATENT DOCUMENTS

CN      2501159      7/2002
CN      1700637      11/2005

OTHER PUBLICATIONS

Satoh et al.; "A Scalable Dual-Field Elliptic Curve Cryptographic Processor" IEEE Transactions on Consumer Computers, vol. 52, No. 4, Apr. 2003.

* cited by examiner

METHOD AND APPARATUS FOR ONE TIME PROGRAMMING

CROSS REFERENCE TO RELATED APPLICATIONS

This application claims the benefit of U.S. Provisional Application No. 60/743,126, filed Dec.1, 2006.

BACKGROUND OF THE INVENTION

1. Field of the Invention

The invention relates to copy protection, and in particular, to one-time programming.

2. Description of the Related Art

Figure 1:
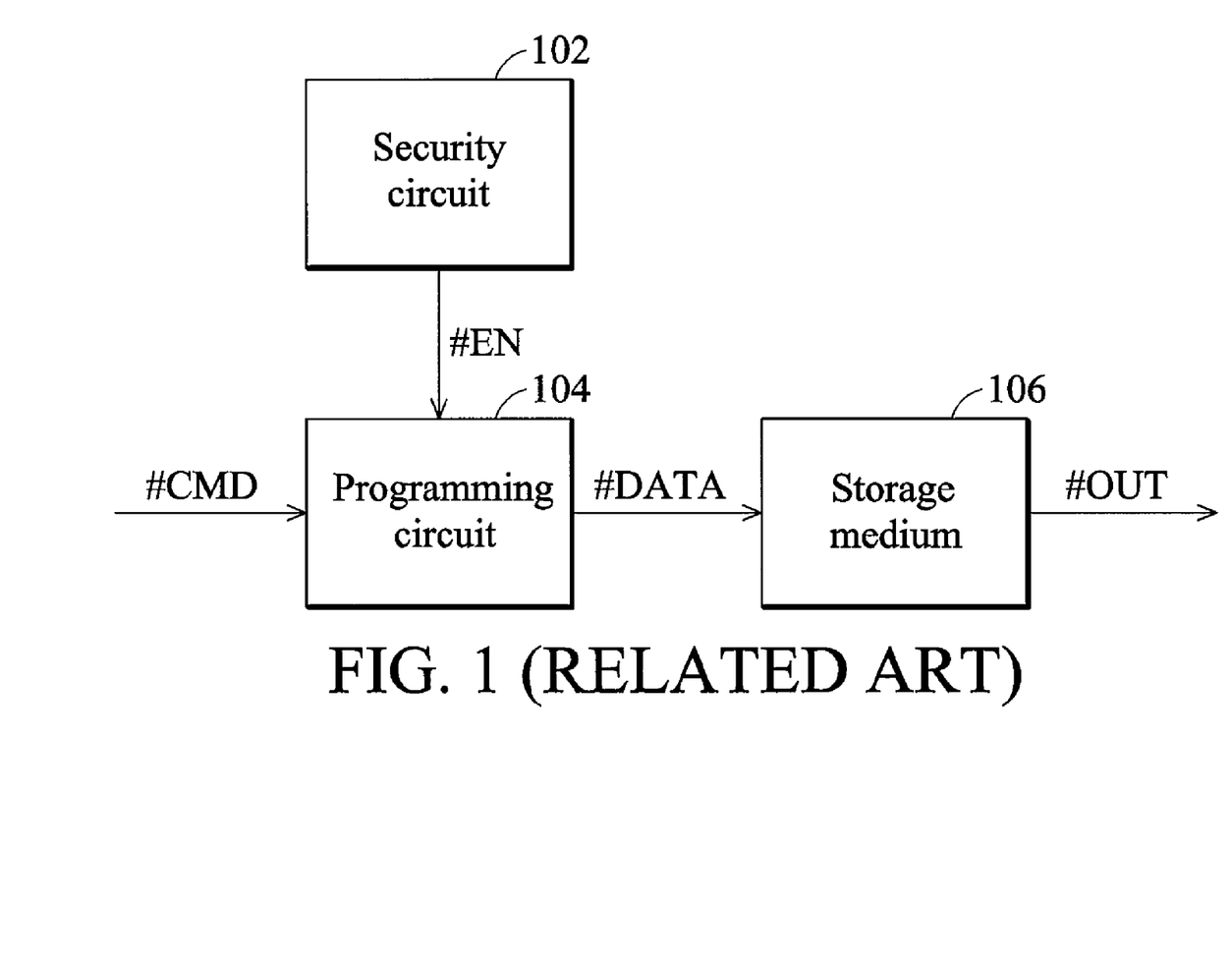
FIG. 1 shows conventional content protection architecture.

FIG. 1 shows conventional content protection architecture. A programming circuit 104 is coupled to storage medium 106, receiving command codes #CMD to program the storage medium 106 with specific data. Data stored in the storage medium 106 is requires full protection, with unauthorized access disallowed. To protect the content in storage medium 106, a security circuit 102 is coupled to the programming circuit 104 to provide security management such as an authentication mechanism or an encryption procedure. When enable signal #EN is sent from security circuit 102, the programming circuit 104 is enabled to program the storage medium 106. This architecture, however, shows a weakness when the security circuit 102 is compromised to send a malicious enable signal #EN. Since storage medium 106 is rewritable, content therein may be altered, since protection from security circuit 102 is disabled. Thus, enhanced data protection is desirable.

BRIEF SUMMARY OF THE INVENTION

An exemplary embodiment of a system for storage of one-time programmable information comprises an interface translator and a one-time programmable device. The interface translator receives and translates a command code to program code comprising a sequence of write instructions and a designated data block. The one-time programmable device is coupled to the interface translator, programmed by the write instructions to store the designated data block. The one-time programmable device renders the designated data block unalterable and non-deletable.

Command codes conform to a first standard, and program codes conform to a second standard interpretable by the one-time programmable device. If the first standard is identical to the second standard, the interface translator comprises an I/O interface directly passing the command codes to the one-time programmable device as the program code. Conversely, if the first standard is different from the second standard, the interface translator further comprises a command interpreter coupled to the I/O interface for interpreting the command codes to generate the program code. The I/O interface may be a microprocessor interface, an IDE interface or a SATA interface. The one-time programmable device may be an electrical fuse or a one-time programmable (OTP) silicon intellectual property.

The one-time programmable device may comprise a protection circuit and a plug-in device. The protection circuit receives the program code and executes the write instructions to perform a programming procedure. The plug-in device is coupled to the protection circuit, comprising a memory device storing the designated data block when the protection circuit performs the programming procedure. The memory device may be a flash ROM or an Electrically Erasable Programmable Read-Only Memory (EEPROM). When the designated data block is stored in the memory device, the protection circuit is disabled, rendering the designated data block unalterable and non-deletable.

A programming method is further provided. The memory device may comprise rewritable and non-rewritable entries. The protection circuit may provide a management mechanism to handle access to the entries. The interface translator receives a command code and generates program code to the one-time programmable device. When the program code is input, the protection circuit determines the entry to which the write instruction will be applied. If the entry is rewritable, the protection circuit allows the designated data block to be stored therein. Conversely, if the entry is non-rewritable, the protection circuit determines whether the entry has already been programmed. If so, further access to the entry is denied. Otherwise, the protection circuit allows the designated data block to be written in the entry. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
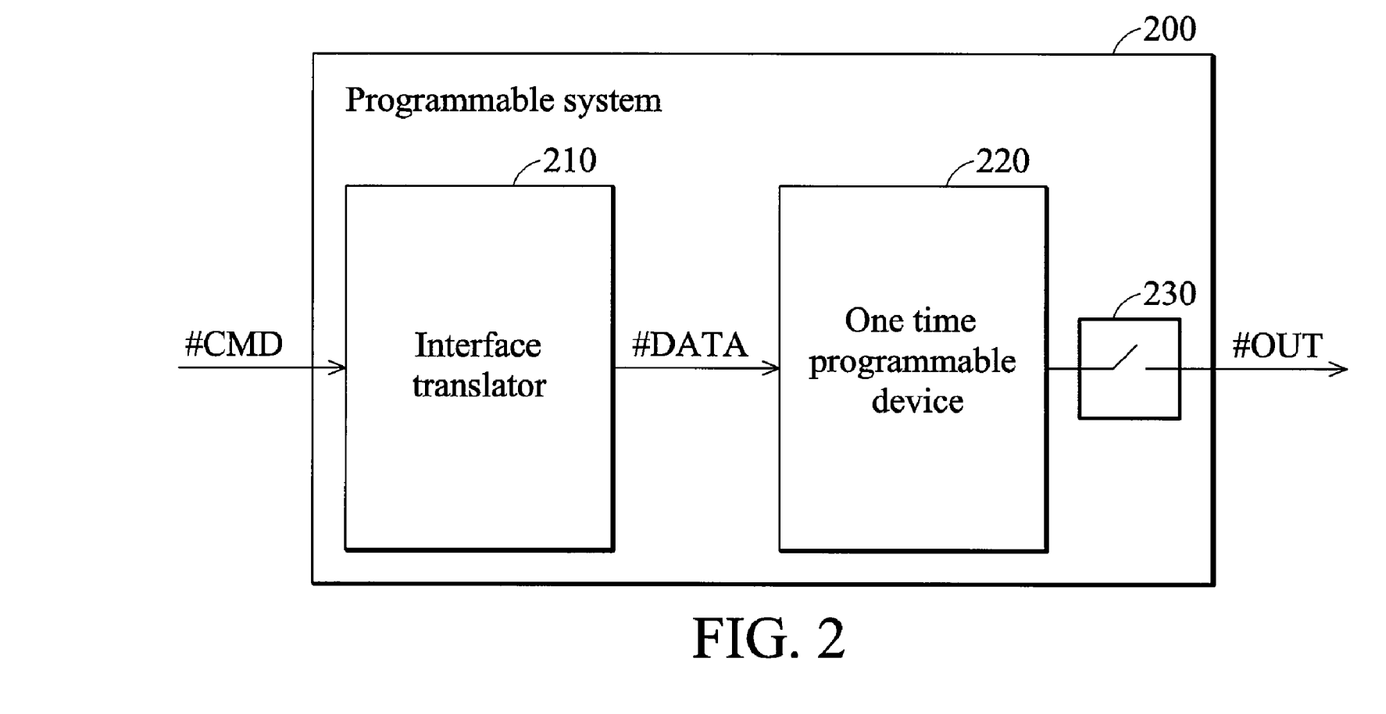
FIG. 2 shows an embodiment of a programmable system 200 according to the disclosure.

FIG. 2 shows an embodiment of a programmable system 200 according to the disclosure. The programmable system 200 comprises an interface translator 210 and a one-time programmable device 220. The interface translator 210 receives and translates a command code #CMD to program code #DATA comprising a sequence of write instructions and a designated data block. The designated data block comprises contents to be protected. The one-time programmable device 220 executes the write instructions and writes to the designated data block. As the designated data block is written to, the one-time programmable device 220 is no longer programmable. The programmable system 200 can be specifically used in embedded systems such as BD-RE devices to protect copyright tags or certificates. The one-time programmable device 220 may be implemented by an electrical fuse or a specifically designed one-time programmable (OTP) silicon intellectual property. Correspondingly, the program code #DATA sent to the one-time programmable device 220 follow the electrical fuse protocol or the OTP protocol. The programmable system 200 may further comprise a switch 230 coupled to the one-time programmable device 220, serving as a maintenance to inhibit read access to the designated data block when opened.

Figure 3A:
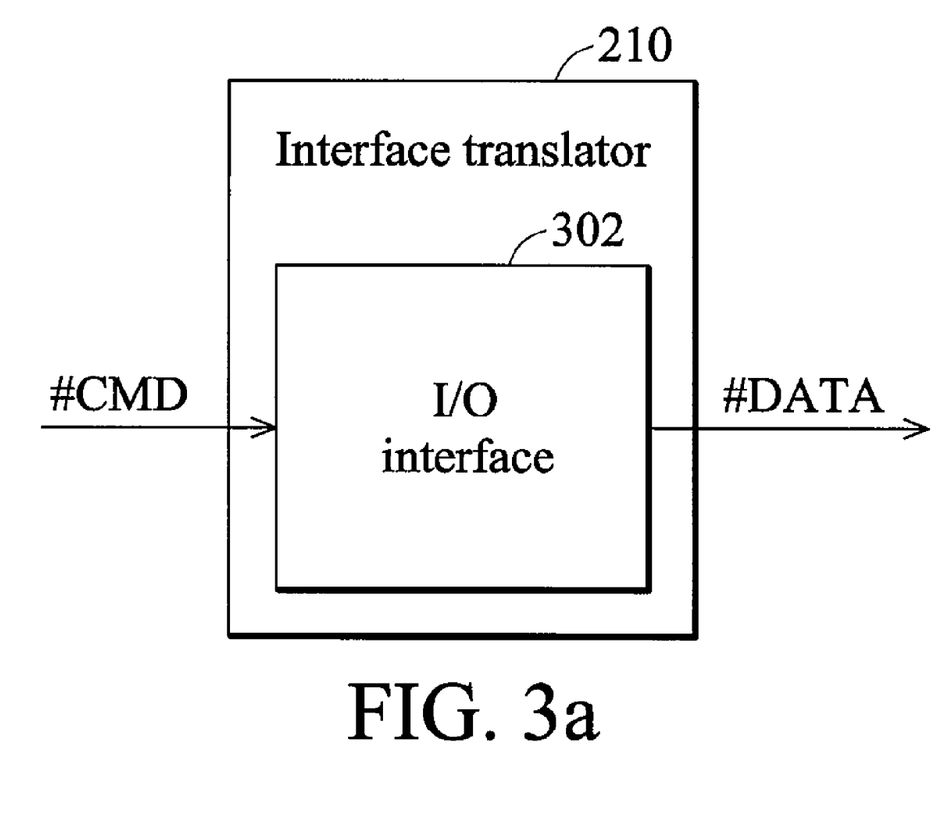
FIGS. 3a and 3b show embodiments of the interface translator 210 according to FIG. 2.
Figure 3B:
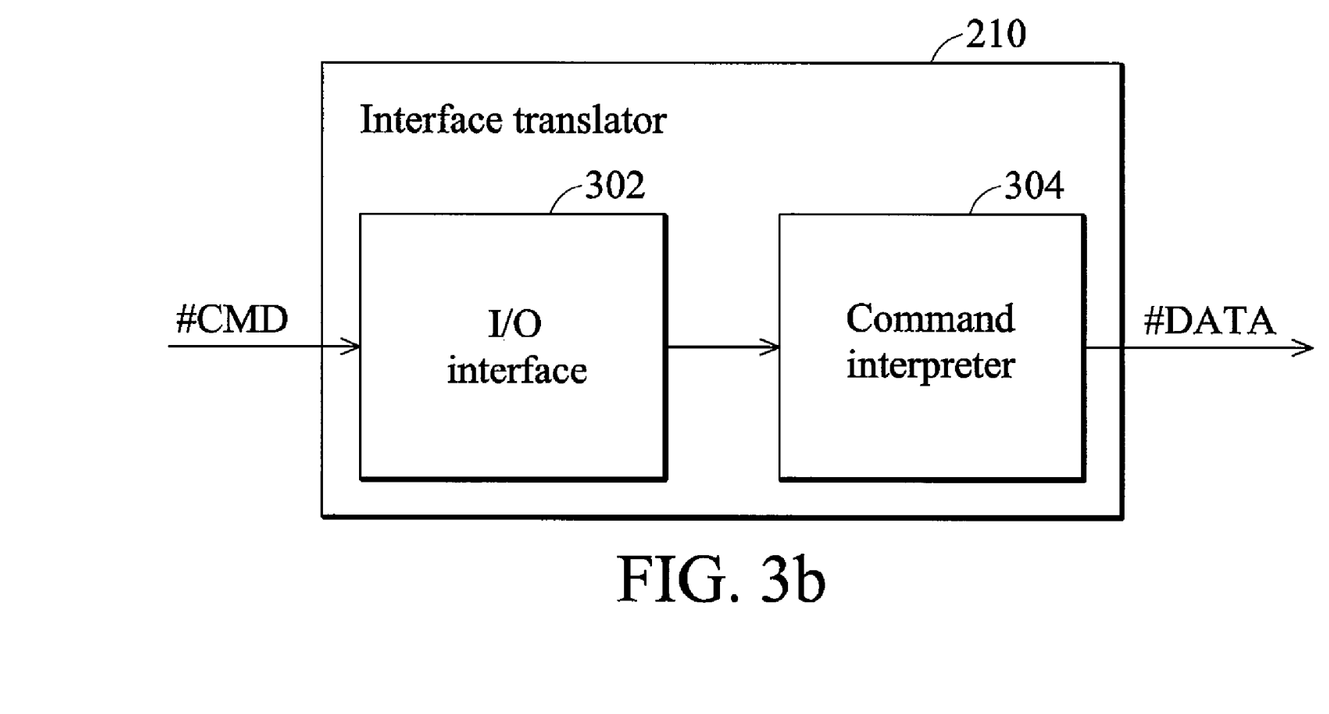

FIGS. 3a and 3b show embodiments of the interface translator 210 according to FIG. 2. In FIG. 3a, the interface translator 210 comprises an I/O interface 302, receiving the command codes #CMD and outputting the program code #DATA. The I/O interface 302 may be simply an I/O interface such as microprocessor interface, IDE interface or SATA interface, directly passing the command codes #CMD to the one-time programmable device 220 as program code #DATA without format conversion. Thus, the format of command codes #CMD is required to follow a protocol interpretable by the one-time programmable device 220. An external device (not shown) such as a microprocessor, an IDE device or a SATA device may be connected to the input of the interface translator 210 to provide the command codes #CMD.

In FIG. 3b, the interface translator 210 may further comprise a command interpreter 304 coupled to the I/O interface 302, providing better compatibility to accept a command code #CMD of various formats. The format of command codes #CMD is not necessarily identical to that of the program code #DATA, and only the format of program code #DATA is interpretable by the one-time programmable device 220. When I/O interface 302 retrieves the command codes #CMD from an external device such as a microprocessor, a SATA device or an IDE device, the command interpreter 304 interprets the command codes #CMD to generate the program code #DATA bound to the one-time programmable device 220.

Figure 4A:
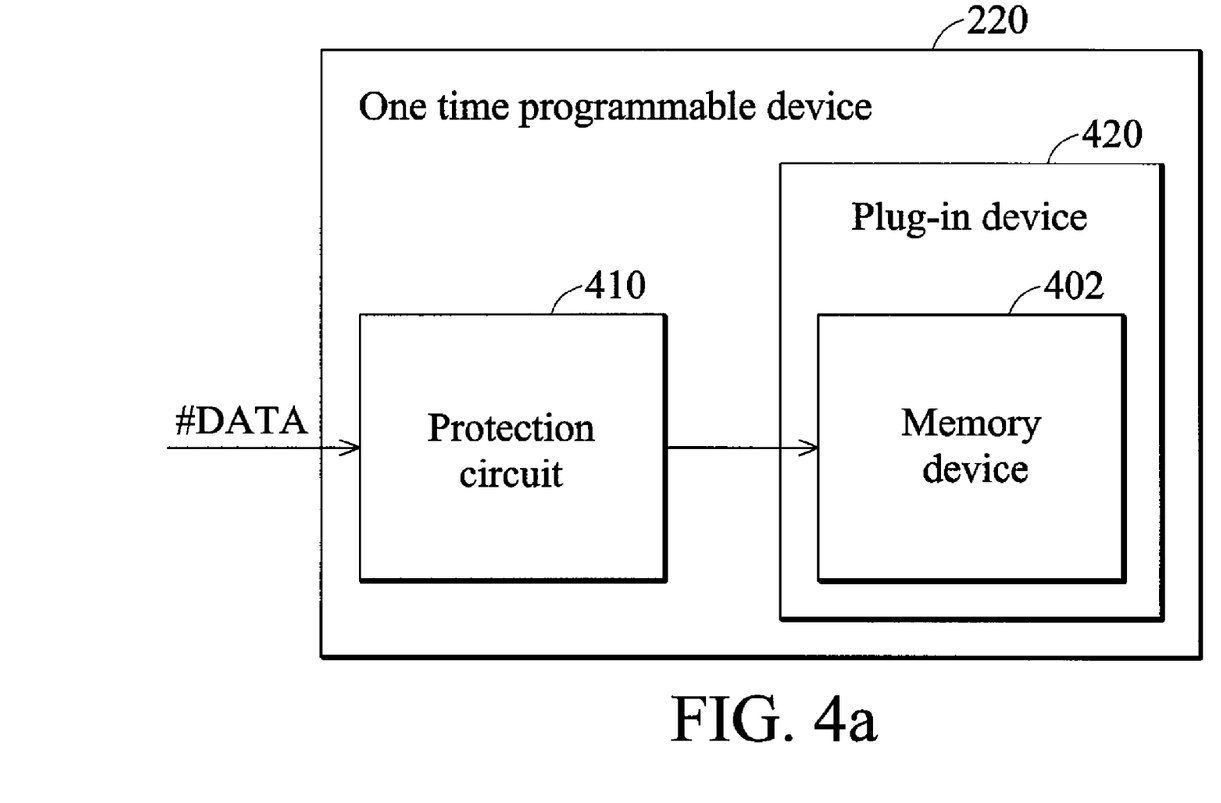
FIGS. 4a and 4b show embodiments of the one-time programmable device 220 according to FIG. 2.
Figure 4B:
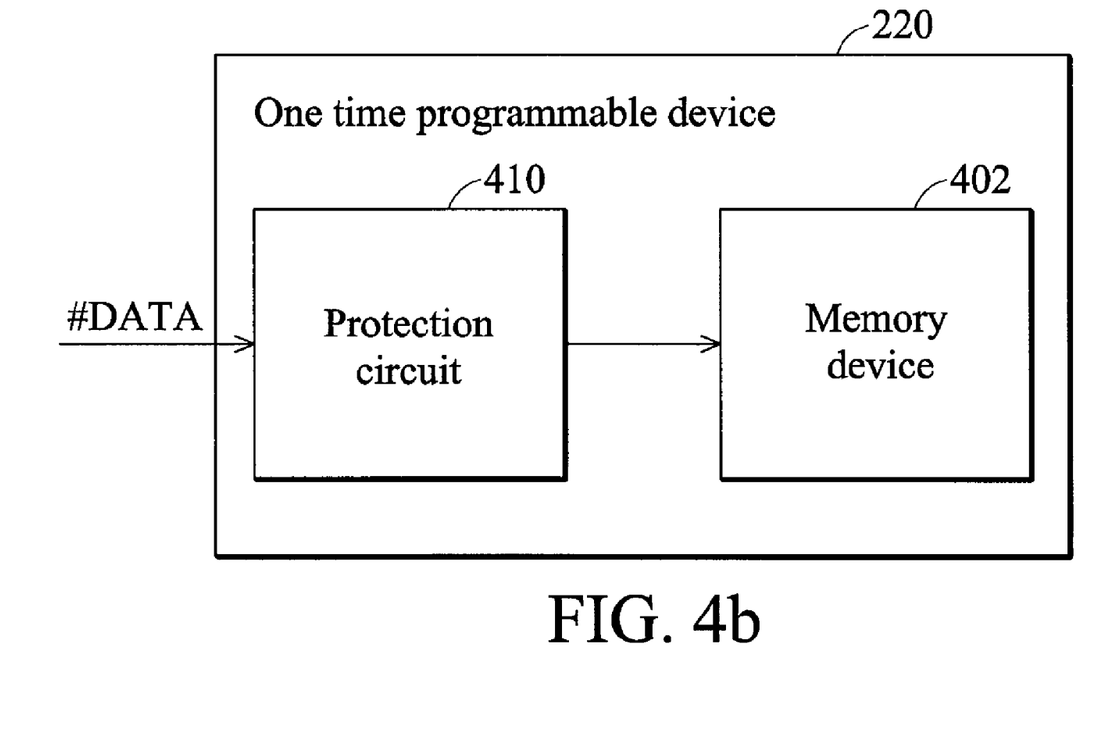

FIGS. 4a and 4b show embodiments of the one-time programmable device 220 according to FIG. 2. In FIG. 4a, the one-time programmable device 220 comprises a protection circuit 410 and a plug-in device 420. The plug-in device 420 may be a storage medium comprising a memory device 402. The memory device 402 can be a flash ROM or an Electrically Erasable Programmable Read-Only Memory (EEPROM). The protection circuit 410 ensures the plug-in device 420 is only programmed once. For the first programming procedure, the protection circuit 410 receives the program code #DATA to execute the write instructions thereto, and stores the designated data block into the memory device 402. When the designated data block is stored in the memory device 402, the protection circuit 410 is disabled, such that the plug-in device 420 is inaccessible to the interface translator 210, and the designated data block in the memory device 402 is fully protected.

FIG. 4b shows another embodiment of the one-time programmable device 220. In this embodiment, the architecture is simplified, comprising only a protection circuit 410 and a memory device 402. Similarly, the protection circuit 410 ensures the memory device 402 is only programmed once. For the first programming procedure, the protection circuit 410 receives the program code #DATA to execute the write instructions therein, and stores the designated data block into the memory device 402. When the designated data block is stored in the memory device 402, the protection circuit 410 is disabled, such that the one-time programmable device 220 is inaccessible to the interface translator 210, and the designated data block in the memory device 402 is fully protected.

Figure 5:
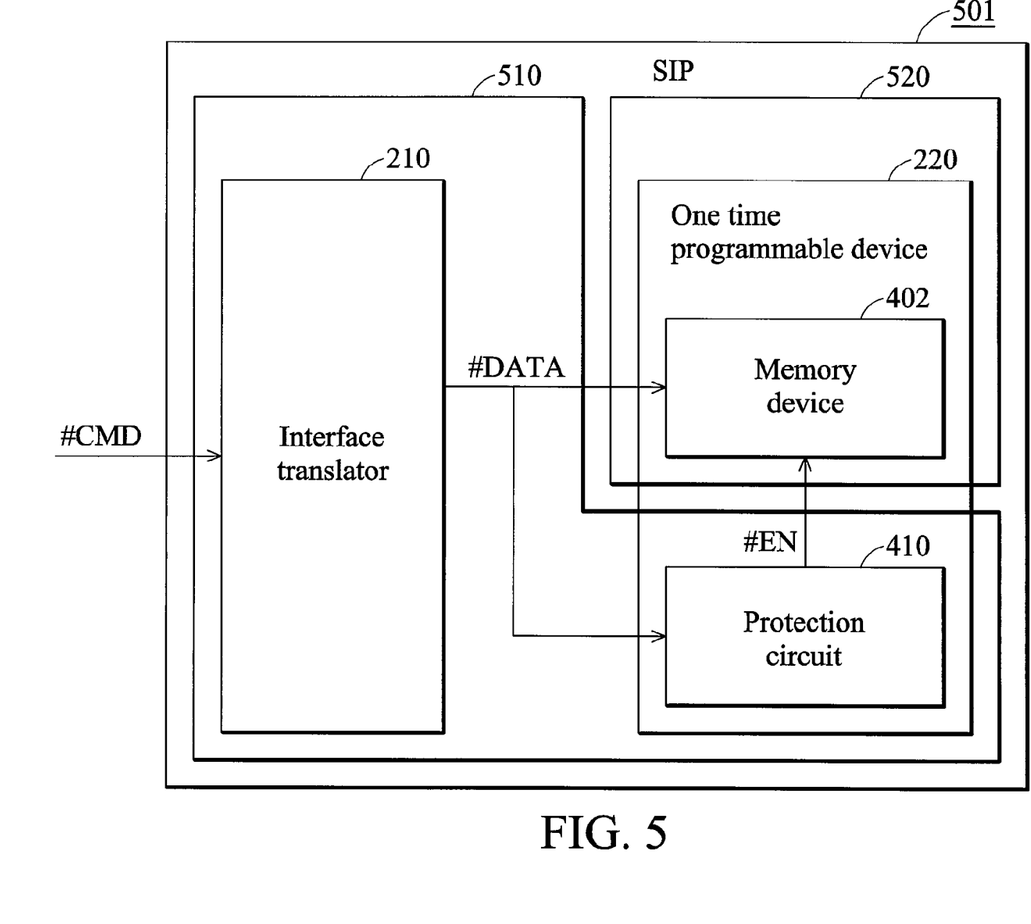
FIG. 5 shows an embodiment of the system in package (SIP) 501.

FIG. 5 shows an embodiment of a system in package (SIP) 501. A system in package may be implemented by mulit-chip package (MCP) or multi-chip module (MCM). For example, a MCM consists of two or more integrated circuits in one module or in one package for improved packaging efficiency. In this embodiment, the interface translator 210 and protection circuit 410 are packaged together in the chip 510, and the chip 520 packages the memory device 402.

Figure 6:
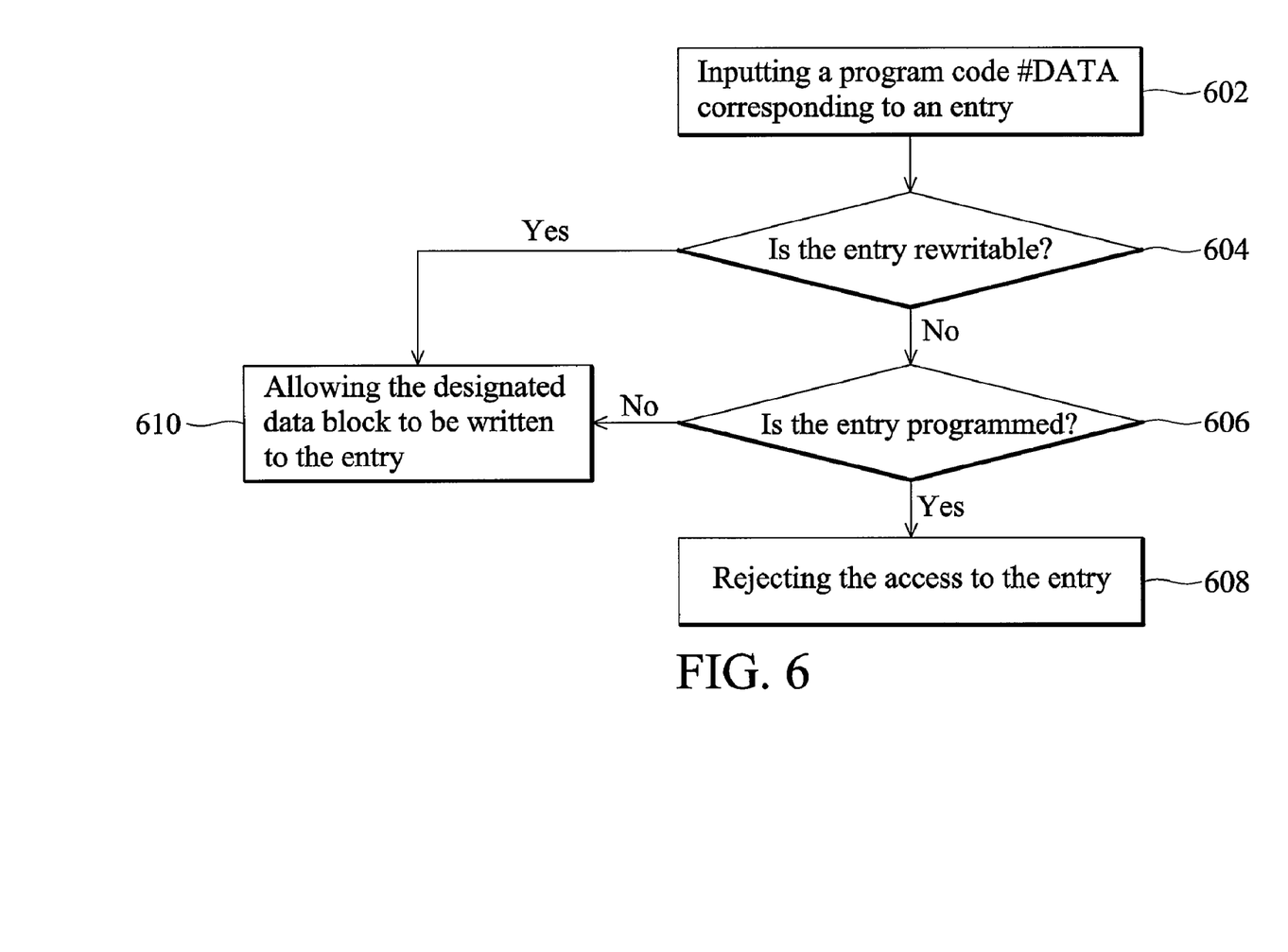
FIG. 6 is a flowchart of the programming method according to FIGS. 4a and 4b.

FIG. 6 is a flowchart of the programming method according to FIG. 4a or 4b. In the embodiments, the memory device 402 comprises rewritable and non-rewritable entries. The protection circuit 410 manages access to the entries. In step 602, the interface translator 210 receives a command code #CMD and generates program code #DATA to the one-time programmable device 220. In step 604, when the program code #DATA is input, the protection circuit 410 determines the type of an entry where the write instructions about to access. If the entry is rewritable, the procedure goes to step 610, in which the protection circuit 410 allows the designated data block to be stored therein. Conversely, if the entry is non-rewritable, the protection circuit 410 determines whether the entry is already programmed in step 606. If so, further access to the entry is denied in step 608. Otherwise, step 610 is processed, in which the protection circuit 410 allows the designated data block to be written in the entry.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A programmable system for storage of one-time programmable information, comprising:
    an interface translator, receiving and translating a command code to program code comprising a sequence of write instructions and a designated data block;
    a one-time programmable device, coupled to the interface translator, programmed by the write instructions to store the designated data block; wherein the one-time programmable device can only be programmed once.

2. The programmable system as claimed in claim 1, wherein:
    the command codes conform to a first format standard, and the program code conforms to a second format standard interpretable by the one-time programmable device;
    the first format standard is identical to the second format standard; and
    the interface translator comprises an I/O interface directly passing the command codes to the one-time programmable device as the program code.

3. The programmable system as claimed in claim 2, wherein the I/O interface is a microprocessor interface connective to a microprocessor for retrieval of the command codes.

4. The programmable system as claimed in claim 2, wherein:
    the I/O interface is an IDE interface connective to an IDE device for retrieval of the command codes.

5. The programmable system as claimed in claim 2, wherein the I/O interface is a SATA interface connective to a SATA device for retrieval of the command codes.

6. The programmable system as claimed in claim 1, wherein:
    the command codes conform to a first format standard, and the program code conforms to a second format standard interpretable by the one-time programmable device;
    the first format standard is different from the second format standard; and
    the interface translator comprises:

a I/O interface, connective to an external unit for retrieval of the command codes; and a command interpreter, coupled to the I/O interface, interpreting the command codes to generate the program code.

7. The programmable system as claimed in claim 6, wherein:
the I/O interface is a microprocessor interface
the external unit is a microprocessor; and
the first format standard is a microprocessor protocol.

8. The programmable system as claimed in claim 6, wherein:
the I/O interface is an IDE interface;
the external unit is an IDE device; and
the first format standard is an IDE protocol.

9. The programmable system as claimed in claim 6, wherein:
the I/O interface is a SATA interface;
the external unit is a SATA device; and
the first format standard is a SATA protocol.

10. The programmable system as claimed in claim 1, wherein:
the one-time programmable device is an electrical fuse or an one-time programmable (OTP) silicon intellectual property; and
the second format standard is electrical fuse or OTP protocol.

11. The programmable system as claimed in claim 1, wherein the one-time programmable device comprises:
a protection circuit, receiving the program code and executing the write instructions to perform a programming procedure; and
a plug-in device, coupled to the protection circuit, comprising a memory device, storing the designated data block when the protection circuit performs the programming procedure; wherein:
the memory device is a flash ROM or an Electrically Erasable Programmable Read-Only Memory (EEPROM);
when the designated data block is stored in the memory device, the protection circuit is disabled, protecting the designated data block.

12. The programmable system as claimed in claim 1, wherein the one-time programmable device comprises:
a protection circuit, receiving the program code and executing the write instructions to perform a programming procedure; and
a memory device, coupled to the protection circuit, storing the designated data block when the protection circuit performs the programming procedure; wherein when the designated data block is stored in the memory device, the protection circuit is disabled, such that the designated data block in the memory device is fully protected.

13. The programmable system as claimed in claim 12, wherein:
the protection circuit comprises a valid entry allowing the designated data block to be written to the memory device for the first time; and
when the designated data block is written to the memory device, the valid entry is disabled, such that the protection circuit does not accept further write instructions to program the memory device.

14. The programmable system as claimed in claim 12, wherein the memory device is a flash ROM or an Electrically Erasable Programmable Read-Only Memory (EEPROM).

15. The programmable system as claimed in claim 12, wherein the memory device is implemented in different chip with interface translator and protection circuit.

16. The programmable system as claimed in claim 1, further comprising a switch coupled to the one-time programmable device, providing a read inhibition to the designated data block when opened.

17. A copy protection method for storage of one-time programmable information in a programmable system, wherein the programmable system comprises:
an interface translator;
a one-time programmable device, coupled to the interface translator; and
the copy protection method comprises:
the interface translator receiving and translating a command code to program code comprising a sequence of write instructions and a designated data block; and
the one-time programmable device executing the write instructions to store the designated data block; wherein the one-time programmable device can only be programmed once, such that the designated data block being stored is fully protected.

18. The copy protection method as claimed in claim 17, wherein:
the one-time programmable device comprises a protection circuit and a memory device;
the memory device comprises a plurality of rewritable entries and non-rewriteable entries;
the protection circuit manages the entries; and
the copy protection method further comprises:
when the protection circuit receives the program code, the protection circuit determining whether an entry corresponding to the write instructions is rewritable;
if the entry is rewritable, the protection circuit writing the designated data block thereto;
if the entry is non-rewritable and already programmed, the protection circuit rejecting access to the entry; and
if the entry is non-rewritable and not yet programmed, the protection circuit allowing the designated data block to be written thereto.

* * * * *